(12) United States Patent
McCoy et al.

(10) Patent No.: US 12,732,245 B2
(45) Date of Patent: Sep. 8, 2026

(54) HYBRID DIGITAL DELAY BEAMFORMING CIRCUITS AND METHODS

(71) Applicant: CesiumAstro, Inc., Austin, TX (US)

(72) Inventors: James Wesley McCoy, Leander, TX (US); Thomas Magesacher, Austin, TX (US); Tanim Taher, Round Rock, TX (US)

(73) Assignee: CesiumAstro, Inc., Austin, TX (US)

( * ) Notice: Subject to any disclaimer, the term of this patent is extended or adjusted under 35 U.S.C. 154(b) by 0 days.

(21) Appl. No.: 18/648,320

(22) Filed: Apr. 26, 2024

(65) Prior Publication Data

US 2026/0051932 A1 Feb. 19, 2026

Related U.S. Application Data

(60) Provisional application No. 63/462,243, filed on Apr. 26, 2023.

(51) Int. Cl.
*H04B 7/06* (2006.01)

(52) U.S. Cl.
CPC .................................. *H04B 7/0617* (2013.01)

(58) Field of Classification Search
None
See application file for complete search history.

(56) References Cited

U.S. PATENT DOCUMENTS 5,220,163 A * 6/1993 Toughlian .............. G02B 26/06 359/287
5,388,079 A * 2/1995 Kim ..................... G10K 11/345 600/447

(Continued)

FOREIGN PATENT DOCUMENTS

AU 2019271227 A1 * 1/2021 ............. A61B 5/055
AU 2019271227 B2 * 5/2023 ............. A61B 5/055

(Continued)

OTHER PUBLICATIONS

K. -J. Kim, J. Hong Kang, J. -H. Hwang and K. -H. Ahn, "Hybrid Beamforming Architecture and Wide Bandwidth True-Time Delay for Future High Speed Communications 5G and Beyond 5G Beamforming System," 2018 IEEE (Year: 2018).*

(Continued)

*Primary Examiner* — Berhanu Tadese
(74) *Attorney, Agent, or Firm* — Hogan Lovells Cadwalader US LLP

(57) ABSTRACT

An integrated circuit may include a phase shifting/partial beamforming network circuit and a plurality of true time delay (TTD) circuits. The beamforming circuit may include a plurality of receive inputs. Each receive input may be coupled to one of a plurality of antenna elements. The beamforming circuit may include a plurality of receive/transmit connectors, each of which may correspond to a beam of a plurality of beams. The beamforming circuit may include a plurality of transmit outputs each of which may be coupled to one of the plurality of antenna elements. Each TTD circuit may include a first connection coupled to one of the receive/transmit connector outputs and a second connection coupled to one of a plurality of serial lines. Each TTD circuit may be configured to apply one or more of an integer delay or a fractional delay to data received from the receive/transmit connector or the serial line.

20 Claims, 6 Drawing Sheets

(56) References Cited

U.S. PATENT DOCUMENTS 5,663,736 A * 9/1997 Webb ....................... H01Q 3/46 250/227.12
6,507,315 B2 * 1/2003 Purdy .................... H01Q 25/00 342/174
6,934,511 B1 * 8/2005 Lovinggood .......... H01Q 1/007 455/24
7,227,813 B2 * 6/2007 Miller ................. G01S 15/8909 600/443
7,260,141 B2 * 8/2007 Bierly ...................... H01Q 3/26 375/295
7,635,334 B2 * 12/2009 Phelps .................. G01S 7/5208 600/447
7,714,782 B2 * 5/2010 Davis ..................... H01Q 21/22 342/99
8,257,262 B2 * 9/2012 Petersen ............... G01S 7/5208 600/459
8,320,283 B2 * 11/2012 Kim ........................ H04L 1/001 370/260
8,605,224 B2 * 12/2013 Trager ............. H04N 21/42638 348/725
8,610,625 B2 * 12/2013 Le Grange ............... H01Q 3/22 342/373
9,059,779 B2 * 6/2015 Li .......................... H03M 9/00
9,099,776 B2 * 8/2015 Vasavada ............. H04B 7/2041
9,490,882 B1 * 11/2016 Schelstraete ......... H04B 7/0452
9,762,302 B1 * 9/2017 Shaked ................ H04B 7/0417
9,791,552 B1 * 10/2017 Schuman ............... H01Q 3/267
9,819,407 B2 * 11/2017 Kim ........................ H04L 25/49
9,825,687 B2 * 11/2017 Kim ..................... H04B 7/0671
10,116,051 B2 * 10/2018 Scarborough ............ H01Q 3/14
10,263,330 B2 * 4/2019 Martikkala ............ H01Q 21/00
10,553,947 B2 * 2/2020 Scarborough ............ H01Q 3/14
10,559,880 B1 * 2/2020 Garrett ..................... H01Q 3/38
10,601,494 B2 * 3/2020 Vannucci .............. H04W 16/28
10,771,123 B2 * 9/2020 Huo ...................... H04L 1/0625
10,819,405 B2 * 10/2020 Cai ...................... H04B 7/0617
11,101,828 B2 * 8/2021 Dolatsha .............. H04B 1/0067
11,128,332 B2 * 9/2021 Manian ................... H03F 3/195
11,178,628 B2 * 11/2021 Kundargi .............. H04L 27/261
11,245,289 B2 * 2/2022 Johnston ................... H02J 7/42
11,381,297 B2 * 7/2022 Kundargi ............... H04B 7/088
11,400,306 B2 * 8/2022 Dolgoff .................. A61B 5/055
11,424,539 B2 * 8/2022 Alpman ............... H01Q 9/0414
11,589,140 B2 * 2/2023 Kwon ...................... H01Q 3/30
11,595,109 B2 * 2/2023 Kundargi ............... H04B 7/088
11,621,754 B2 * 4/2023 Aghajanzadeh ..... H04B 7/0617 375/267
11,621,757 B2 * 4/2023 Jam .......................... H01Q 3/24 375/267
11,652,524 B2 * 5/2023 Jam .......................... H01Q 3/24 375/267
11,699,861 B2 * 7/2023 Williams ............. H01Q 25/008 343/700 R
11,699,862 B2 * 7/2023 Brown ................. H04B 7/0617 343/702
11,791,876 B2 * 10/2023 Rainish ................ H04B 7/0617 375/267
11,799,601 B2 * 10/2023 Moshfeghi .......... H04W 72/046
11,955,732 B2 * 4/2024 Alpman ............... H01Q 9/0414
12,040,557 B1 * 7/2024 Sharma .................... H01Q 3/38
12,136,014 B2 * 11/2024 Mecca ............... G06K 7/10356
12,199,724 B2 * 1/2025 Ratnam .................... H04B 7/01
12,237,589 B2 * 2/2025 Alpman ............... H01Q 9/0414
12,250,018 B1 * 3/2025 Chi .......................... H04B 1/40
12,280,268 B2 * 4/2025 Dolgoff .................. A61B 5/055
12,316,027 B2 * 5/2025 Pace ........................ H01Q 5/48
12,362,500 B2 * 7/2025 Williams ........... H01Q 21/0031
12,425,065 B2 * 9/2025 Lindoff ................ H04B 1/0003
12,476,659 B1 * 11/2025 Peiffer ................ H04B 1/0003
2002/0154687 A1 * 10/2002 Bierly ...................... H01Q 3/30 375/222
2002/0171583 A1 * 11/2002 Purdy .................... H01Q 25/00 342/368
2004/0110469 A1 * 6/2004 Judd ...................... H01Q 1/007 455/562.1
2005/0004464 A1 * 1/2005 Miller ................. G01S 15/8909 600/443
2005/0110641 A1 * 5/2005 Mendolia .................. G01S 5/04 343/893
2005/0131299 A1 * 6/2005 Robinson ............ G01S 15/8927 600/447
2005/0148873 A1 * 7/2005 Petersen ............. G01S 15/8927 600/447
2005/0195103 A1 * 9/2005 Davis ..................... H01Q 21/22 342/158
2005/0228277 A1 * 10/2005 Barnes ................ G01S 15/8927 600/459
2005/0243812 A1 * 11/2005 Phelps ................. G10K 11/346 370/360
2006/0280116 A1 * 12/2006 Ji ......................... H04B 7/0617 370/329
2007/0242567 A1 * 10/2007 Daft ...................... G01S 7/5208 367/140
2009/0213275 A1 * 8/2009 Trager ..................... H04N 5/44 370/476
2012/0162011 A1 * 6/2012 Le Grange ........... H01Q 3/2682 342/375
2012/0213035 A1 * 8/2012 Yoo ..................... G01S 15/8997 367/138
2013/0121342 A1 * 5/2013 Kim ...................... H04W 72/56 375/329
2014/0146861 A1 * 5/2014 Li ............................ H04B 1/40 375/219
2014/0314167 A1 * 10/2014 Jeong .................. H04B 7/0626 375/267
2018/0108989 A1 * 4/2018 De Flaviis ........... H01Q 9/0435
2018/0115087 A1 * 4/2018 Besoli ...................... H01Q 3/26
2018/0198206 A1 * 7/2018 Park ......................... H01Q 3/34
2018/0219587 A1 * 8/2018 Huo ........................... H04B 1/40
2018/0269576 A1 * 9/2018 Scarborough ............ H01Q 3/14
2019/0074588 A1 * 3/2019 Scarborough ............ H01Q 3/14
2019/0229774 A1 * 7/2019 Gharavi ................... H01Q 3/28
2020/0076461 A1 * 3/2020 Manian ................ H04B 1/0007
2020/0091608 A1 * 3/2020 Alpman ............... H01Q 9/0414
2021/0136703 A1 * 5/2021 Kundargi .............. H04L 5/0007
2021/0385561 A1 * 12/2021 Kwon ............. H04B 10/25752
2021/0391903 A1 * 12/2021 Jam .......................... H01Q 3/24
2021/0391904 A1 * 12/2021 Jam .......................... H01Q 3/24
2022/0059950 A1 * 2/2022 Brown ................. H04B 7/0617
2022/0329344 A1 * 10/2022 Fellhauer .............. H04W 12/02
2022/0360303 A1 * 11/2022 Rainish ................ H04B 7/0848
2022/0384956 A1 * 12/2022 Alpman ............... H01Q 9/0414
2023/0087065 A1 * 3/2023 Sikri .................... H04B 7/0617
2023/0141288 A1 * 5/2023 Williams ............... H01Q 1/246 455/562.1
2023/0145401 A1 * 5/2023 Alpman ............... H01Q 9/0414 343/700 MS
2023/0268966 A1 * 8/2023 Svendsen ................. H04B 1/18 342/372
2024/0243477 A1 * 7/2024 Alpman ............... H01Q 9/0414
2024/0405444 A1 * 12/2024 Varonen ............. H01Q 21/0025
2025/0012891 A1 * 1/2025 Zwirn .................... G08G 5/727
2025/0167844 A1 * 5/2025 Zhang .................. H04B 7/0639
2025/0233636 A1 * 7/2025 McCoy .................. H04B 7/086
2025/0235713 A1 * 7/2025 Dolgoff .................. A61B 5/055
2025/0253543 A1 * 8/2025 Taher ..................... H01Q 3/267

FOREIGN PATENT DOCUMENTS

AU 2023214215 A1 * 8/2023 ............. A61B 5/055
CA 2397430 A1 * 7/2001 ............. G01S 19/25
CA 3054265 A1 * 9/2018 ........... H01Q 21/061
CA 3106809 A1 * 11/2019 ............. A61B 5/055
CA 3153883 A1 * 4/2021 ....... G06K 19/07773
CN 1453901 A * 11/2003 ......... H01Q 21/0056
CN 1231997 C * 12/2005 ......... H01Q 21/0087
CN 102857287 A * 1/2013 ............... H01Q 3/22
CN 103532604 A * 1/2014
CN 103941235 A * 7/2014 ........... H01Q 3/2676
CN 104297731 A * 1/2015 ............. G01S 7/282

(56) References Cited

FOREIGN PATENT DOCUMENTS

| | | | | | |
|---|---|---|---|---|---|
| CN | 103532604 | B | * | 3/2016 | |
| CN | 103941235 | B | * | 7/2016 | G01S 7/282 |
| CN | 104297731 | B | * | 1/2017 | |
| CN | 106533557 | A | * | 3/2017 | H04B 10/1123 |
| CN | 102857287 | B | * | 6/2017 | G01S 13/26 |
| CN | 106533557 | B | * | 8/2018 | H04B 10/11 |
| CN | 105122869 | B | * | 6/2019 | H04B 7/0626 |
| CN | 110447146 | A | * | 11/2019 | H04B 1/3827 |
| CN | 111988250 | A | * | 11/2020 | H03F 1/3241 |
| CN | 112368939 | A | * | 2/2021 | H03M 1/502 |
| CN | 115426019 | A | * | 12/2022 | H04B 7/0617 |
| CN | 116827398 | A | * | 9/2023 | H04B 7/0456 |
| CN | 115426019 | B | * | 5/2024 | H04B 7/0456 |
| CN | 118117305 | A | * | 5/2024 | H10W 90/00 |
| CN | 110447146 | B | * | 4/2025 | H10W 90/00 |
| CN | 120834833 | A | * | 10/2025 | H04B 7/0408 |
| DE | 102004060575 | A1 | * | 7/2005 | G01S 7/5208 |
| DE | 102004060575 | B4 | * | 2/2012 | G01S 15/8927 |
| DE | 112017006442 | T5 | * | 9/2019 | H04B 7/0482 |
| DE | 112018008226 | T5 | * | 9/2021 | H03B 5/12 |
| EP | 3376595 | A1 | * | 9/2018 | H01Q 25/007 |
| EP | 3235134 | B1 | * | 5/2019 | H03L 7/0891 |
| EP | 3427394 | B1 | * | 4/2021 | H01Q 3/38 |
| EP | 3376595 | B1 | * | 11/2021 | H01Q 3/46 |
| EP | 4009443 | A1 | * | 6/2022 | H04B 7/0617 |
| EP | 4053999 | A1 | * | 9/2022 | H01Q 25/007 |
| EP | 4092912 | A1 | * | 11/2022 | H04B 1/40 |
| EP | 4011053 | B1 | * | 8/2023 | H04K 1/08 |
| EP | 4092912 | B1 | * | 9/2024 | H04B 7/0691 |
| EP | 4451572 | A2 | * | 10/2024 | H04B 7/0691 |
| EP | 4633045 | A1 | * | 10/2025 | H04L 27/364 |
| FI | 20215912 | A1 | * | 3/2023 | H01Q 3/36 |
| FR | 3067535 | A1 | * | 12/2018 | H04B 7/2041 |
| GB | 2592259 | A | * | 8/2021 | H01Q 3/2694 |
| IL | 287739 | A | * | 5/2023 | G01S 5/0294 |
| IT | 102019000024577 | B1 | * | 12/2021 | |
| JP | 2003324304 | A | * | 11/2003 | H01Q 21/0087 |
| KR | 20080014037 | A | * | 2/2008 | H04B 7/0617 |
| KR | 20170049952 | A | * | 5/2017 | H04B 7/0632 |
| KR | 20190089955 | A | * | 7/2019 | H04B 15/04 |
| KR | 20210086620 | A | * | 7/2021 | G01R 29/105 |
| KR | 20210152381 | A | * | 12/2021 | H01Q 3/26 |
| KR | 20220103353 | A | * | 7/2022 | H04B 7/0686 |
| KR | 20230040986 | A | * | 3/2023 | H04B 7/06952 |
| KR | 20230040987 | A | * | 3/2023 | H04B 7/06952 |
| KR | 20240072422 | A | * | 5/2024 | H04B 17/336 |
| SG | 11202011371 | | * | 12/2020 | A61B 5/055 |
| TW | I782936 | B | * | 11/2022 | H10W 90/00 |
| TW | 202345532 | A | * | 11/2023 | H10W 90/00 |
| TW | I849535 | B | * | 7/2024 | H10W 90/00 |
| TW | 202435572 | A | * | 9/2024 | H10W 90/00 |
| WO | WO-9423422 | A1 | * | 10/1994 | G10K 11/345 |
| WO | WO-0152447 | A2 | * | 7/2001 | H01Q 23/00 |
| WO | WO-02069443 | A1 | * | 9/2002 | H04B 7/086 |
| WO | WO-2004084341 | A2 | * | 9/2004 | G01S 7/5209 |
| WO | WO-2006135518 | A2 | * | 12/2006 | H04B 7/0617 |
| WO | WO-2014178648 | A1 | * | 11/2014 | H04B 7/0691 |
| WO | WO-2015127575 | A1 | * | 9/2015 | H01Q 3/2676 |
| WO | WO-2016195556 | A1 | * | 12/2016 | H04B 7/085 |
| WO | WO-2017020968 | A1 | * | 2/2017 | H04W 56/00 |
| WO | WO-2017153985 | A1 | * | 9/2017 | H01Q 3/38 |
| WO | WO-2017202536 | A1 | * | 11/2017 | H04B 17/12 |
| WO | WO-2018119153 | A2 | * | 6/2018 | H10W 90/00 |
| WO | WO-2018167717 | A1 | * | 9/2018 | H01Q 1/288 |
| WO | WO-2018195453 | A1 | * | 10/2018 | H04Q 3/00 |
| WO | WO-2019138378 | A1 | * | 7/2019 | H04B 17/24 |
| WO | WO-2019222436 | A2 | * | 11/2019 | G01R 33/60 |
| WO | WO-2020261261 | A1 | * | 12/2020 | H04B 7/0617 |
| WO | WO-2021023494 | A1 | * | 2/2021 | H04W 12/122 |
| WO | WO-2021071986 | A1 | * | 4/2021 | G06K 7/10366 |
| WO | WO-2021165433 | A1 | * | 8/2021 | H04B 7/086 |
| WO | WO-2021252928 | A2 | * | 12/2021 | H04B 7/06952 |
| WO | WO-2021252929 | A1 | * | 12/2021 | H04B 7/06952 |
| WO | WO-2022003246 | A1 | * | 1/2022 | H01Q 21/28 |
| WO | WO-2022040552 | A2 | * | 2/2022 | H01Q 3/40 |
| WO | WO-2022198395 | A1 | * | 9/2022 | H04B 7/0671 |
| WO | WO-2022243060 | A1 | * | 11/2022 | H04B 1/40 |
| WO | WO-2023031508 | A1 | * | 3/2023 | H01Q 3/36 |
| WO | WO-2023073663 | A1 | * | 5/2023 | G01S 5/0294 |
| WO | WO-2023075417 | A1 | * | 5/2023 | H04B 7/0617 |
| WO | WO-2023208319 | A1 | * | 11/2023 | G02F 1/292 |
| WO | WO-2025212891 | A1 | * | 10/2025 | H04B 7/0617 |

OTHER PUBLICATIONS

W. Ding, G. Yang, J. Liu, Y. -C. Liang and Y. Liu, "Near-Field Wideband Hybrid Beamforming with Deep Reinforcement Learning," in IEEE Transactions on Wireless Communications, doi: 10.1109/TWC.2025. (Year: 2025).*

K. Spoof, V. Unnikrishnan, M. Zahra, K. Stadius, M. Kosunen and J. Ryynänen, "True-Time-Delay Beamforming Receiver With RF Re-Sampling," in IEEE Transactions on Circuits and Systems I: Regular Papers, vol. 67, No. 12, pp. 4457-4469, Dec. 2020 (Year: 2020).*

R. Rotman, M. Tur and L. Yaron, "True Time Delay in Phased Arrays," in Proceedings of the IEEE, vol. 104, No. 3, pp. 504-518, Mar. 2016, (Year: 2016).*

V. Venkateswaran and A. -J. van der Veen, "Partial beamforming to reduce ADC power consumption in antenna array systems," 2008 IEEE 9th Workshop on Signal Processing Advances in Wireless Communications, Recife, Brazil, 2008, pp. 146-150, (Year: 2008).*

M. Dasan, G. Prusty, A. Machani and E. S. Perumal, "Beam Squint Mitigation Using Digital Beam Formers for Wideband Radar Applications," 2021 2nd International Conference on Range Technology (ICORT), Chandipur, Balasore, India, 2021, pp. 1-6, (Year: 2021).*

A. Zamanifekri and A. B. Smolders, "Beam Squint Compensation in Circularly Polarized Offset Reflector Antennas Using a Sequentially Rotated Focal-Plane Array," in IEEE Antennas and Wireless Propagation Letters, vol. 14, pp. 815-818, 2015. (Year: 2015).*

L. Morgan and H. Andersson, "An efficient beamforming method using a combination of analog true time and digital delay," Proceedings of the 2002 IEEE Radar Conference (IEEE Cat. No. 02CH37322), Long Beach, CA, USA, 2002, pp. 260-265, (Year: 2002).*

J. Zhang et al., "Delay Alignment Modulation With Hybrid Analog/Digital Beamforming for Millimeter Wave and Terahertz Communications," in IEEE Transactions on Wireless Communications, vol. 24, No. 9, pp. 7360-7376, Sep. 2025, (Year: 2025).*

R. J. Provan, L. H. Crockett, R. W. Stewart and S. Weiss, "Farrow-Based True Time-Delay FPGA Wideband Digital Beamforming Architecture," 2025 IEEE Symposium on Computers and Communications (ISCC), Bologna, Italy, 2025, pp. 1-6, (Year: 2025).*

J. Shen, H. Yuan, Z. Zhang, X. Gao, D. B. da Costa and K. Yang, "Mitigating Group Delay Mismatch in Terahertz Hybrid Beamforming Systems: A Frequency-Selective Joint Analog-Digital Framework," in IEEE Transactions on Communications, vol. 73, No. 12, pp. 15722-15736, Dec. 2025, (Year: 2025).*

* cited by examiner

HYBRID DIGITAL DELAY BEAMFORMING CIRCUITS AND METHODS

CROSS-REFERENCE TO RELATED APPLICATION(S)

The present disclosure claims priority to U.S. Provisional Ser. No. 63/462,243 filed on Apr. 26, 2023 and entitled "Hybrid Digital Delay Beamforming Circuits and Methods", which is incorporated herein by reference in its entirety.

FIELD

The present disclosure is generally related to beamforming circuits for satellite communications, and more particularly, to hybrid digital delay beamforming circuits that apply a true time delay to the partially formed beams at the output of each partial beamforming network.

BACKGROUND

Radio frequency (RF) signals are used in communication devices such as transmitters, receivers, computers, televisions, mobile phones, satellites, base stations, and other systems used in wireless communications. For example, RF signals may communicate voice data, message data, and other data from a transmitting system to a receiving system through the air, from terrestrial base stations to satellites, and between satellites. Typically, RF signals used in communications may be within a frequency range that extends from amplitude modulated (AM) radio frequencies of approximately 50 kilohertz (kHz) through microwave frequencies over 1 Gigahertz (GHz). The 5G communications network currently being deployed by mobile phone service providers is configured to operate over a wide range of frequencies including 600-850 Megahertz (MHz) for low-band 5G, 2.5-3.7 GHz for mid-band 5G, and 25-39 GHz for high-band 5G.

In general, RF signals are propagating electromagnetic fields that carry data between an emitting antenna system and a receiving antenna system. The receiving antenna system may include multiple antenna elements arranged in a particular configuration, each of which is configured to convert a received electromagnetic waveform into an electrical signal. Though the RF signals travel at the speed of light, each antenna element may receive the RF signal at a different point in time, producing timing offsets, which need to be accounted for to recover the data from the received RF signal.

In general, each antenna may receive a signal comprised of multiple beams, which beams may be extracted and processed to recover the transmitted signal. Conventionally, to account for the delays, the receiver circuitry may include a time delay circuit for each antenna/beam combination, and each time delay circuit may implement a filter that requires several multiply operations.

SUMMARY

Embodiments of hybrid digital delay beamforming circuits and methods are described herein that significantly reduce power consumption by applying a single phasor multiplication operation to each antenna/beam combination and by only applying the true time delay to partially formed beams at the output of each partial beamforming network, significantly reducing the number of multiply operations and the overall power consumption.

In some implementations, an integrated circuit may include a phase shifting/partial beamforming network circuit and a plurality of true time delay (TTD) circuits. The phase shifting/partial beamforming network circuit may include a plurality of receive inputs. Each receive input may be coupled to one of a plurality of antenna elements. The phase shifting/partial beamforming network circuit may include a plurality of receive/transmit connectors, each of which may correspond to a beam of a plurality of beams. The phase shifting/partial beamforming network circuit may include a plurality of transmit outputs each of which may be coupled to one of the plurality of antenna elements. Each TTD circuit may include a first connection coupled to one the receive/transmit connector outputs and a second connection coupled to an adder network, which may be coupled to serializer/deserializer (SERDES) logic. Each TTD circuit may be configured to apply one or more of an integer delay or a fractional delay to data received from the one of the receive/transmit connectors or the SERDES logic.

In other implementation, a system may include an integrated circuit that includes a phase shifting/partial beamforming network (PSPBN) circuit and a plurality of true time delay (TTD) circuits. The PSPBN circuit may include a plurality of first connectors, where each first connector may be coupled to and configured to receive a signal from one of a plurality of antenna elements. The PSPBN circuit may include a plurality of second connectors, where each second connector may correspond to a beam of a plurality of beams. The PSPBN circuit may be configured to separate the signal into a plurality of antenna/beam signals in response to receiving signals at the plurality of antenna elements. Each antenna/beam signal may correspond to a beam of a plurality of beams. The PSPBN circuit may be configured to multiply each antenna/beam signal by a phasor to produce an adjusted antenna/beam signal, combine the adjusted antenna/beam signals from each input to produce a partial beam output signal for each of the plurality of beams, and provide each partial beam output signal to one of the plurality of second connectors. Each TTD circuit may include a first connector coupled to one of the plurality of second connectors of the PSPBN and may include a second connector. Each TTD circuit may be configured to apply a true time delay to the partial beam output signal at the one of the plurality of outputs of the PSPBN to produce a delayed partial beam output signal and to provide the delayed partial beam output signal to the second connector of the TTD circuit. The PSPBN may include an adder network coupled to the second connectors of the plurality of TTD circuits and may be configured to accumulate the delayed partial beam output signals for each beam.

In still other implementations, a system may include an integrated circuit that includes a phase shifting/partial beamforming network (PSPBN) circuit, serializer/deserializer (SERDES) logic, a plurality of true time delay (TTD) circuits, and a plurality of bypass circuits. The PSPBN circuit may include a plurality of first connectors and a plurality of second connectors. Each first connector may be coupled to one of a plurality of antenna elements. Each second connector may correspond to a beam of a plurality of beams. Each TTD circuit may be coupled between one of the plurality of second connectors and the SERDES logic and may be configured to apply a true time delay to a signal from one of the second connectors or the SERDES logic. Each bypass circuit may include a first terminal coupled to one of the second connectors, a second connector coupled to the SERDES logic, and a control terminal responsive to a control signal from a controller to selectively couple the PSPBN circuit to the SERDES logic to bypass the TTD circuits without applying the true time delays. In a receive operation, the TTD circuit may be coupled to the SERDES logic through an adder network.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. The figures and detailed description thereto are not intended to limit implementations to the form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word “may” is used in a permissive sense (in other words, the term “may” is intended to mean “having the potential to”) instead of in a mandatory sense (as in “must”). Similarly, the terms “include”, “including”, and “includes” mean “including, but not limited to”.

DETAILED DESCRIPTION OF ILLUSTRATIVE EMBODIMENTS

Embodiments of hybrid digital delay beamforming circuits and methods are described below for both reception and transmission of signals via a satellite array. The hybrid digital delay beamforming circuit may include multiple integrated circuits that cooperate to form a full beamforming network. Each integrated circuit may support N antennas and K beams. Each circuit may include a phase shifting/partial beamforming network that may be configured to receive a digital signal and to multiply the digital signal for each antenna/beam combination by a phasor to scale and phase-shift each beam signal from each antenna to produce adjusted beam signals. The phase shifting/partial beamforming network may include an adder to combine the adjusted beam signals to produce partial beam signals, each of which is representative of one of the beams.

Each circuit may also include a true time delay circuit, which may include an integer delay portion and a fractional delay portion to compensate for various delays. The amount of the true time delay may be a function of the angle of arrival of the individual beams. Additionally, the true time delay circuit may be configured to compensate for circuit delays, serializer/deserializer (SERDES) delays, and other delays to produce time-adjusted partial beam signals, which may be combined with corresponding time-adjusted partial beam signals from other circuits in the beamforming network.

In some implementations, the true time delay circuit may be bypassed by selectively activating a bypass circuit. In some implementations, the bypass circuit may be activated or deactivated by a control circuit based on a steering angle for a given signal. For example, if the transmission source is directly aligned with the antenna, then the controller may determine the steering angle does not require a time delay adjustment and may therefore activate the bypass circuit.

Figure 1:
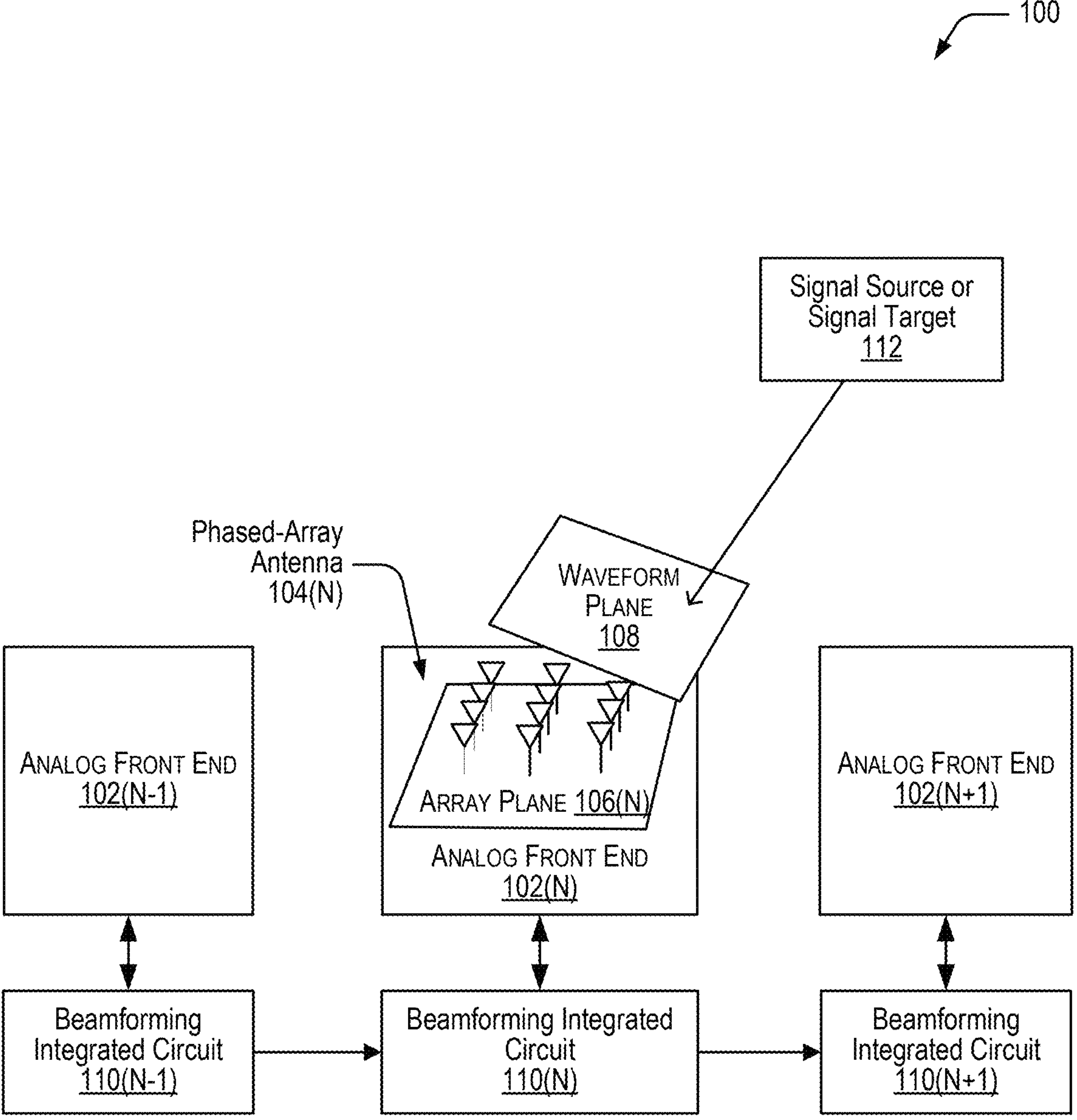
FIG. 1 depicts a block diagram of a system configured to receive waveforms resulting in time delays between receiving antennas that includes a hybrid digital delay beamforming circuit, in accordance with certain embodiments of the present disclosure.

FIG. 1 depicts a block diagram of a system 100 configured to receive waveforms resulting in time delays between receiving antennas that includes a hybrid digital delay beamforming circuit, in accordance with certain embodiments of the present disclosure. The system 100 may include an analog front end 102, which may include an array plane 106 including a phased-array antenna 104 formed from a plurality of antenna elements. In an alternative implementation, the system 100 may include a linear array. In the illustrated example, phased-array antenna 104 may receive a signal as a waveform plane 108 that may arrive at an angle relative to the array plane 106 comprised of a plurality of antenna elements.

Each antenna element of the phased-array antenna 104 may be configured to receive RF signals from a signal source and send RF signals to a signal target. In the illustrated example, the phased array antenna 104 is depicted as receiving RF signals in the waveform plane 108 sent from a signal source/signal target 112. Each antenna element may be coupled to circuitry associated with the analog front end 102 and configured to provide electrical signals indicative of a received RF signal. Each antenna element may also receive electrical signals from the circuitry of the analog front end 102 and may transmit an RF signal related to the received signals to a receiving device. In some implementations, the analog front end 102 may include or may be coupled to digital-to-analog converters (DACs), up-conversion mixers, down-conversion mixers, power amplifiers, and other circuitry that may filter, amplify, phase-shift, or otherwise adjust received signals or signals for transmission.

The circuitry associated with the analog front end 102 may be configured to receive and amplify the signals from the antenna elements and to provide signals for transmission. Additionally, the circuitry within the analog RF front end 102 may be configured to communicate signals to and from one or more beamforming integrated circuits 110. Each antenna signal (transmitted or received) may be comprised of multiple beams.

In a receive operation, the beamforming integrated circuits 110(N−1), 110(N), and 110(N+1) may receive signals from an analog front end 102. Each beamforming integrated circuit 110 may process the received signals to extract and recover beams from the received antenna signals. In a transmit operation, the beamforming integrated circuits 110 (N−1), 110(N), and 110(N+1) may receive beam signals from one or more other circuits and may process and combine the beam signals to produce antenna signals for transmission via a corresponding analog front-end circuit 102.

During a receive operation, the beamforming integrated circuit 110 may be configured to multiply each antenna/beam signal combination by a phasor to produce an adjusted partial beam signal for each beam. The beamforming integrated circuit 110 may be configured to add the adjusted partial beam signals for each beam to produce a partial beam signal. The beamforming integrated circuit 110 may selectively apply a true time delay to each partial beam signal to produce a time-adjusted partial beam signal, which may be combined with corresponding time-adjusted partial beam signals from adjacent beamforming integrated circuits to produce beam output signal.

During a transmit operation, the beamforming integrated circuit 110 may perform a reverse operation, in a true time delay is selectively applied to the beam signal each beam. The beamforming integrated circuit 110 may be configured to multiply each beam/antenna signal combination by a phasor to produce an adjusted partial antenna signal for each antenna. The beamforming integrated circuit 110 may be configured to add each adjusted partial antenna signal to produce the antenna signal, which may be transmitted via the antenna array.

It should be noted that, in this example, the analog front end circuits 102 are separate from the beamforming integrated circuit 110. In other implementations, the analog front end circuit 102 may be incorporated into the beamforming integrated circuit 110. Other implementations are also possible.

Figure 2:
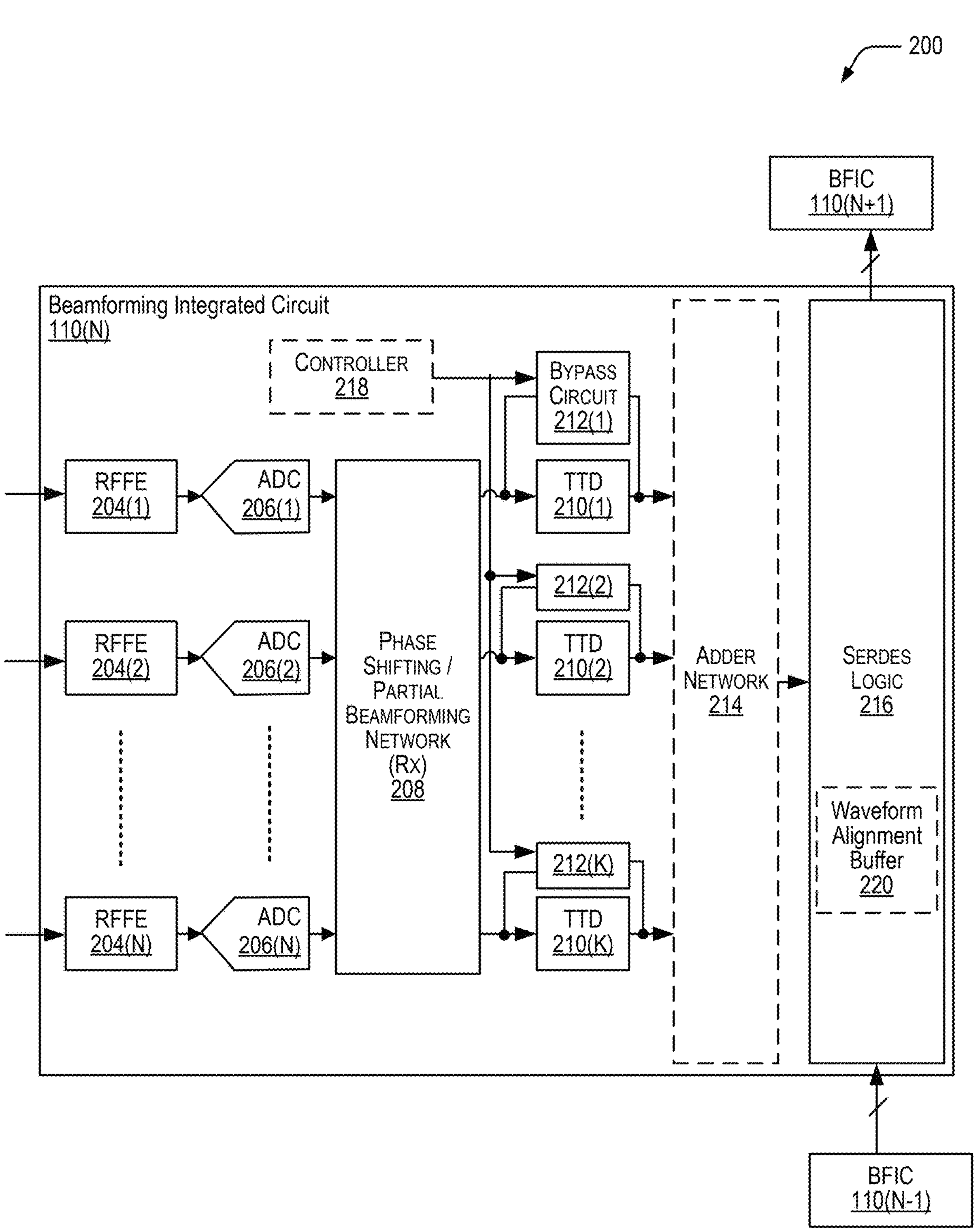
FIG. 2 depicts a block diagram of a beamforming integrated circuit including a hybrid digital delay beamforming circuit and a true time delay to apply a delay to the partially formed beams during a receive operation, in accordance with certain embodiments of the present disclosure.

FIG. 2 depicts a block diagram of a system 200 including beamforming integrated circuits 110 including a hybrid digital delay beamforming circuit and a true time delay (TTD) circuit 210 to apply a delay to the partially formed beams during a receive operation, in accordance with certain embodiments of the present disclosure. The beamforming integrated circuit 110 may represent a baseband data path chip and a portion of the system architecture in the receive path.

The beamforming integrated circuit 110 may include radio frequency front-end (RFFE) circuits 204, each of which may include an input and an output. The input of the RFFE circuit 204 may be coupled to an antenna element of a phased-array antenna array 104. The output of the RFFE circuit 204 may be coupled to an input of an analog-to-digital converter (ADC) 206. The beamforming integrated circuit 110 may include multiple ADCs 206, each of which may include an input coupled to one of the RFFEs 204 and an output. While the RFFEs 204 and the ADCs 206 are depicted as being part of the beamforming integrated circuit 110, it should be understood that the RFFEs 204 and the ADCs 206 may be separate circuits that are external to the beamforming integrated circuit 110. In either implementation, the output of the ADCs 206 may be provided to a phase shifting/partial beamforming network 208, which may be part of the beamforming integrated circuit 110.

The phase shifting/partial beamforming network 208 may be configured to perform digital down-converter operations, phasor multiplication operations, and adder operations to produce a partial beam output for each beam determined from the received antenna signals. In other implementations, the down-converter operations may be performed by a digital down-converter (DDC) circuit, which may be implemented in a separate circuit. The DDC circuit may be configured to convert a radio frequency signal from a first frequency to a lower, intermediate frequency signal for digital processing (e.g., a baseband signal).

In an example, the signal from each antenna may include multiple beam signals. The phase shifting/partial beamforming network 208 may divide each antenna signal into a plurality of antenna/beam signals such that each antenna/beam signal corresponds to one of a plurality of beams K. The phase shifting/partial beamforming network 208 may multiply each antenna/beam signal by a phasor to produce a partial adjusted beam signal. The phase shifting/partial beamforming network 208 may include adders, each of which may correspond to a beam. Each adder may be configured to combine the partial adjusted beam signal for a given beam to produce a partial beam output signal.

The beamforming integrated circuit 110 may include multiple true time delay (TTD) circuits 210 (one for each beam). Each TTD circuit 210 may include an input coupled to a beam output of the phase shifting/partial beamforming network 208 to receive one of the partial beam output signals. The TTD circuit 210 may include an integer portion, a fractional component, and an integer delay to compensate for other delays, including delays associated with serializer/deserializer (SERDES) logic 216. The TTD 210 may be configured to selectively apply a delay to the partial beam output signal to produce a time-adjusted partial beam output signals. Each TTD 212 may include a TTD output to provide the time-adjusted partial beam output signal to an adder network 214, which may be configured to accumulate the time-adjusted partial beam output signals for each beam and to provide the accumulated beam output signals to the SERDES logic 216. The adder network 214 is depicted in phantom because it may be separate from the SERDES logic 216 (as shown) or may be integrated within the SERDES logic 216, depending on the implementation.

The beamforming integrated circuit 110 may include a bypass circuit 212 corresponding to each TTD circuit 210. Each bypass circuit 212 may be coupled between one of the outputs of the phase shifting/partial beamforming network 208 and the adder network 214. The bypass circuit 212 may be selectively enabled by a controller 218, which may be implemented as a circuit (such as an application-specific integrated circuit (ASIC), a field programmable gate array, or another circuit) or as software (such as firmware or other processor-executable code). The controller 218 is depicted in phantom because it may be implemented on the beamforming integrated circuit 110 or may be implemented on an external circuit that may be configured to communicate control signals to the beamforming integrated circuit 110. In operation, the controller 218 may be configured to selectively enable the bypass circuit 212 to form a communication paths between the phase shifting/partial beamforming network 208 and the adder network 214 without adding the true time delay via the TTD circuit 210. In an example, the controller 218 may be configured to determine the steering angle relative to a signal source or a target destination. When the steering angle is within a range, the controller 218 may selectively enable the bypass circuit 212 because the true time delay is not needed for the particular signal. In some implementations, the threshold angle may be within a predetermined range of 90 degrees relative to the planar surface of the antenna array. In one possible implementation, the threshold range may extend from approximately 110 degrees to approximately 70 degrees relative to the surface of the antenna array, such that when the determined steering angle corresponds to this threshold range, the controller 218 may enable the bypass circuits 212 so that the TTD circuits 210 do not add a true time delay. Within this range, the delays may be within a margin of error of the signal processing such that the true time delay is not needed to recover the signals.

The beamforming integrated circuit 110(N) may be coupled to adjacent beamforming integrated circuits 110(N−1) and 110(N+1) via the SERDES logic 216. In this example, the partial beam signals from the beamforming integrated circuit 110(N−1) and from one of the TTD 210 or the bypass circuit 212 may be accumulated by the adder network 214 and the accumulated sum may be provided to SERDES logic 216, which may provide the resulting sum to the next beamforming integrated circuit 110(N+1).

In some implementations, the SERDES logic 216 may include a waveform alignment buffer 220 to accumulate and align the beam data. Since processing by each beamforming integrated circuit 110 may introduce processing delays, the waveform alignment buffer 220 may be configured to align the sample data to produce a coherent beam output signal. While the waveform alignment buffer 220 is depicted as being part of the SERDES logic 216, in some implementations, the waveform alignment buffer 220 may be implemented externally to the SERDES logic 216. In some implementations, the alignment delay could be part of the true time delay provided by the TTD circuit 210.

Figure 3:
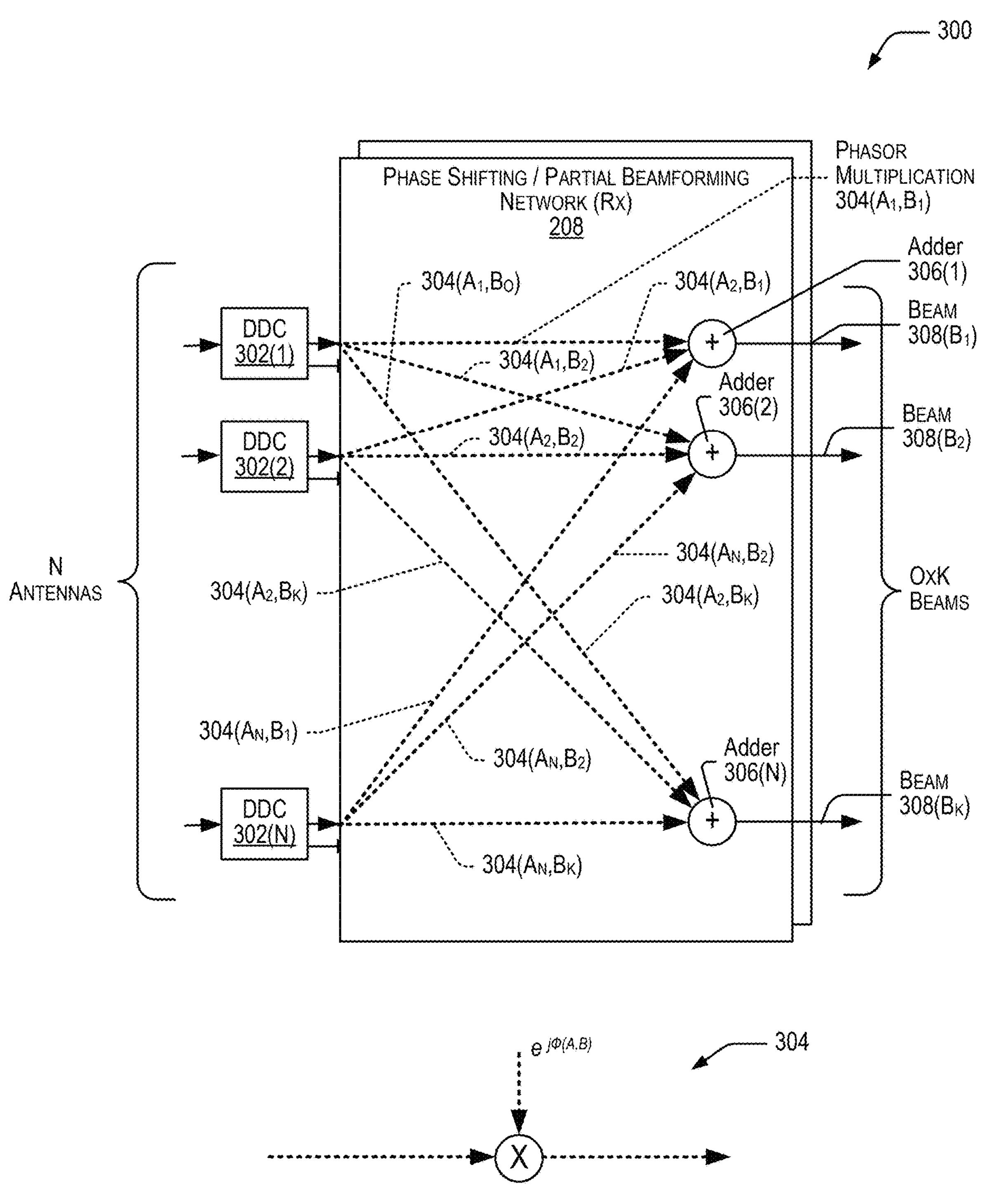
FIG. 3 depicts a block diagram of a portion of the phase shifting/partial beamforming receive network of FIG. 2, in accordance with certain embodiments of the present disclosure.

FIG. 3 depicts a block diagram of a portion 300 of the phase shifting/partial beamforming receive network 208 of FIG. 2, in accordance with certain embodiments of the present disclosure. The phase shifting/partial beamforming receive network 208 may be configured to receive signals from each of the N antennas. The phase shifting/partial beamforming receive network 208 may include or may be coupled to a plurality of digital down-converter (DDC) circuits 302. Each DDC circuit 302 may include an input to receive the signal from one of the antenna elements and may include a plurality of outputs, one for each of a plurality of phase shifting/partial beamforming network circuits 208. It should be appreciated that the number of phase shifting/partial beamforming network circuits 208 corresponds to the number of carriers O. The DDC circuit 302 may convert the antenna signal for each carrier to an intermediate frequency and may provide one of the intermediate frequency carrier signals to a corresponding one of the phase shifting/partial beamforming network circuits 208.

The phase shifting/partial beamforming receive network 208 includes a plurality of phase shifting/partial beamforming network circuits 208, each of which may be configured to divide the output signals from the DDC circuits 302 into an antenna/beam signal, which may correspond to a beam from the signal received from the antenna. The phase shifting/partial beamforming receive network 208 may be configured to perform a phasor multiplication operation 304(A, B) on each antenna/beam signal to produce a scaled and phase-shifted (adjusted) partial beam signal. In the phasor multiplication operation 304(A, B), each antenna/beam signal may be multiplied by the phasor $Se^{j\varnothing(A,\ B)}$ in which S is a scaler, Ø is a phase angle, A is the antenna number, and B is the beam number. The phase shifting/partial beamforming receive network 208 may scale and phase-shift each antenna/beam signal to produce an adjusted partial beam signal.

The adjusted partial beam signal from each phasor multiplication operation 304 is combined by an adder 306 that corresponds to the beam. For example, the adjusted partial beam signals for a first beam may be combined by the adder 306(1) to produce a partial beam output 308($B_1$). Similarly, the adjusted partial beam signals for a second beam may be combined by the adder 306(2) to produce a partial beam output 308($B_2$). The partial beam outputs 308 may be provided to the TTD circuit 210 or, if the bypass circuit 212 is enabled, to the bypass circuit 212.

Figure 4:
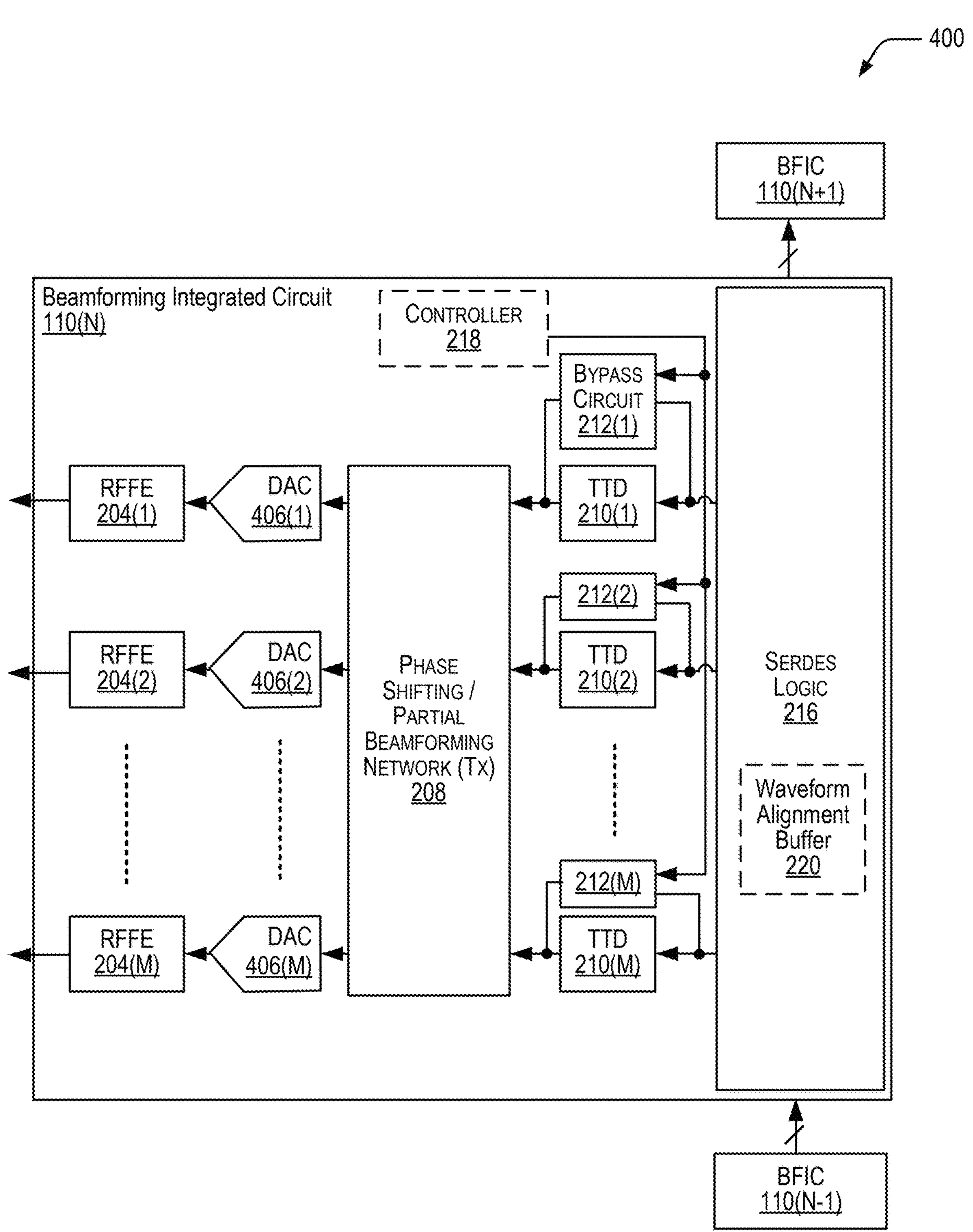
FIG. 4 depicts a block diagram of a beamforming integrated circuit including a hybrid digital delay beamforming circuit and a true time delay to apply a delay to the partially formed beams during a transmit operation, in accordance with certain embodiments of the present disclosure.

FIG. 4 depicts a block diagram 400 of a beamforming integrated circuit 110 including a hybrid digital delay beamforming circuit 208 and a true time delay 210 to apply a delay to the partially formed beams during a transmit operation, in accordance with certain embodiments of the present disclosure. The beamforming integrated circuit 110 may represent a baseband data path chip and a portion of the system architecture in the transmit path. In general, the transmit-side is completely symmetric to the receive-side of the beamforming integrated circuit 110. The same beam data is passed over the SERDES network (via the SERDES logic 216) to every beamforming integrated circuit 110 in the network, then each separate beam is true time delayed by the TTD 210 and passed to the transmit beamforming network and out to the antenna elements. As previously mentioned, the SERDES logic 216 may include a waveform alignment buffer 220 to accumulate and align the beam data. Since processing by each beamforming integrated circuit 110 may introduce processing delays, the waveform alignment buffer 220 may be configured to align the sample data to produce a coherent beam output signal. While the waveform alignment buffer 220 is depicted as being part of the SERDES logic 216, in some implementations, the waveform alignment buffer 220 may be implemented externally to the SERDES logic 216. In some implementations, the alignment delay could be part of the true time delay provided by the TTD circuit 210.

The beamforming integrated circuit 110 may include the radio frequency front-end (RFFE) circuits 204, each of which may include an input and an output. The output of the RFFE circuit 204 may be coupled to an antenna element of a phased-array antenna array 104. The input of the RFFE circuit 204 may be coupled to an output of a digital-to-analog converter (DAC) 406. The beamforming integrated circuit 110 may include multiple DACs 406, each of which may include an output coupled to one of the RFFEs 204 and an input. While the beamforming integrated circuit 110 is shown as including the RFFEs 204 and the DACs 406, it should be appreciated that the RFFEs 204 and the DACs 406 may be included on a separate circuit, which may be coupled to the beamforming integrated circuit 110.

The beamforming integrated circuit 110 may include a phase shifting/partial beamforming network 208 including outputs coupled to the inputs of the DACs 406. The phase shifting/partial beamforming network 208 may be configured to perform digital up-converter (DUC) operations, phasor multiplication operations, and adder operations to produce an antenna output for each antenna based on beams received from one of the TTD 210 or the bypass circuit 212. In some implementations, the DUC operations may be performed by a DUC circuit or a polyphase synthesis bank, which may be part of the phase shifting/partial beamforming network 208 or which may be implemented as a separate circuit. The DUC operations may be configured to convert a lower, intermediate frequency signal to a higher frequency signal for transmission. In some implementations, the DUC operations may include combining signals from multiple phase shifting/partial beamforming network circuits 208 to produce an antenna output signal that can be provided to the DAC 406 for transmission via the RFFE 204.

The beamforming integrated circuit 110 may include the SERDES logic 216 to couple to adjacent beamforming integrated circuits 110(N+1) and 110(N−1). Beam signals may be received from SERDES logic 216 and may be provided to the TTDs 210, which may adjust the true time delay of the signal. In an example, the TTD 210 may add one or more of an incremental time delay and a fractional time delay and may provide the delayed beam signal to the phase shifting/partial beamforming network 208. Alternatively, the bypass circuits 212 may be enabled by the controller 210 and the beam signals from the SERDES logic 216 may be provided to the input of the phase shifting/partial beamforming network 208, avoiding the TTD circuits 210.

The phase shifting/partial beamforming network 208 may divide each beam signal into a plurality of beam/antenna signals such that each beam/antenna signal is provided to one of the antennas after the phasor multiplication and summing operations. In this example, each beam signal is split into a number of beam signals (one for each antenna), multiplied by phasor, and combined with other partial beam/antenna signals to produce an antenna output signal. The phase shifting/partial beamforming network 208 may include adders, each of which may correspond to an antenna and a carrier. Each adder may be configured to combine the partial adjusted beam/antenna signal for a given antenna to produce an antenna output signal, which may be combined to form the antenna output signal.

In this example, the DACs 406 may convert the digital antenna output signals to analog antenna output signals, which may be provided to the RFFEs 204 for transmission. It should be appreciated that each antenna output signal may include signals associated with each of the beams.

Figure 5:
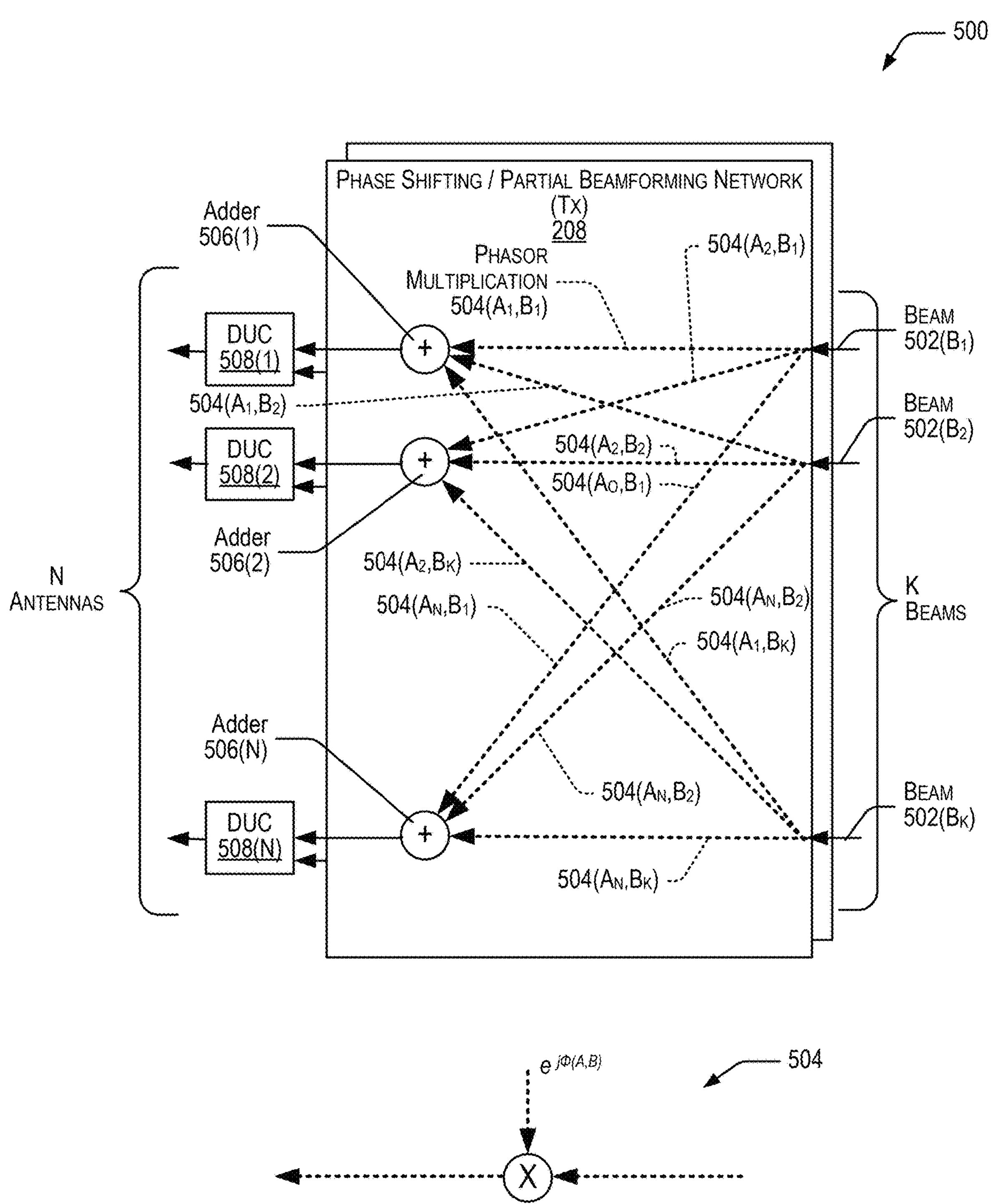
FIG. 5 depicts a block diagram of a phase shifting/partial beamforming transmit network of the beamforming integrated circuit of FIG. 4, in accordance with certain embodiments of the present disclosure.

FIG. 5 depicts a block diagram 500 of a phase shifting/partial beamforming transmit network 208 of the beamforming integrated circuit of FIG. 4, in accordance with certain embodiments of the present disclosure. The phase shifting/partial beamforming transmit network 208 may be configured to receive signals from the SERDES logic 216 and optionally the TTDs 210 in FIG. 4. The phase shifting/partial beamforming receive network 208 may include or may be coupled to a plurality of digital up-converter (DUC) circuits 508, each of which is configured to up-convert an antenna output signal from an intermediate frequency band to a transmission frequency band. While the DUC circuits 508 are depicted as being external to the phase shifting/partial beamforming transmit network 208, in some implementations, the phase shifting/partial beamforming transmit network 208 may include the DUC circuits 508.

The phase shifting/partial beamforming transmit network 208 may be configured to divide each beam signal into a beam/antenna signal, each of which may be processed with other beam/antenna signals corresponding to a selected antenna to produce an antenna output signal for one of the antennas. The phase shifting/partial beamforming transmit network 208 may be configured to perform a phasor multiplication operation 504(A, B) on each beam/antenna signal to produce a scaled and phase-shifted (adjusted) partial antenna signal. In this example, each beam/antenna signal may be multiplied by the phasor $Se^{j\O(A,\,B)}$ in which S is a scaler, Ø is a phase angle, A is the antenna number, and B is the beam number. The phase shifting/partial beamforming transmit network 208 may scale and phase-shift each beam/antenna signal to produce an adjusted partial antenna signal.

The adjusted partial antenna signal from each phasor multiplication operation 504 is combined by an adder 506 that corresponds to the antenna. For example, the adjusted partial antenna signals for the first antenna may be combined by the adder 506(1) to produce an antenna output signal, which may be provided to the input of the digital up-converter 508(1) to produce a transmission signal to be provided to the antennas for transmission. Similarly, the adjusted partial antenna signals for the second antenna may be combined by the adder 506(2) to produce an antenna output signal that may be provided to the input of the digital up-converter 508(2).

Figure 6:
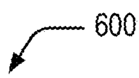
FIG. 6 depicts a block diagram of a circuit including a true time delay circuit and a bypass circuit, in accordance with certain embodiments of the present disclosure.
Figure 6:
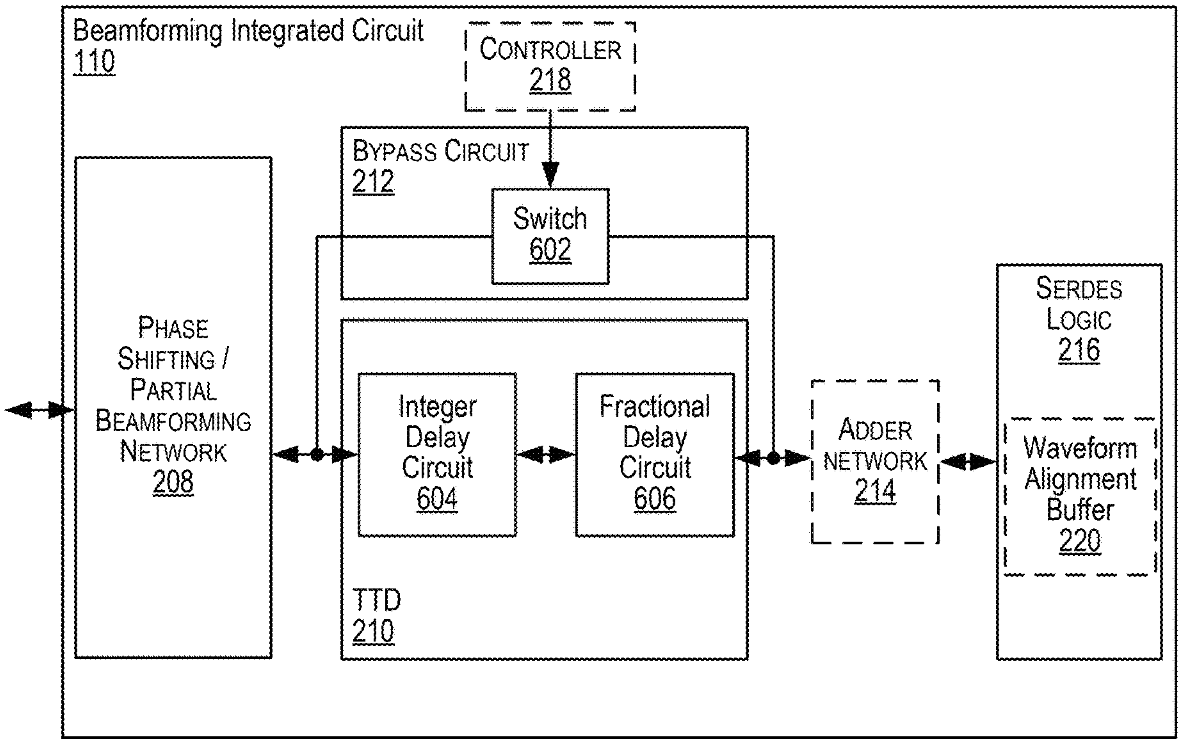

FIG. 6 depicts a block diagram of a circuit 600 including a true time delay circuit 210 and a bypass circuit 212, in accordance with certain embodiments of the present disclosure. In this example, the circuit 600 may include the beamforming integrated circuit 110, a portion of which is shown.

The beamforming integrated circuit 110 includes the phase shifting/partial beamforming network 208 including an input and including an output. The bypass circuit 212 may include a switch 602 coupled between the output of the phase shifting/partial beamforming network 208 and the adder network 214 (in a receive mode) or the SERDES logic 216 (in a transmit mode). The switch 602 may include a control input coupled to the controller 218. In some examples, the switch 602 may include a transistor configured to turn on in response to a signal applied by the controller 218, diverting an output signal from the phase shifting/partial beamforming network 208 to the output to the adder network 214. When the switch 602 is activated, the bypass circuit 212 may present a short circuit path that bypasses the TTD 210.

The controller 218 may be implemented in hardware, software, or a combination thereof. In some implementations, the controller 218 may be implemented as a field-programmable gate array (FPGA) circuit, an application specific integrated circuit (ASIC), other configurable circuitry, or any combination thereof. In some implementations, the controller 218 may be implemented in software that may be executed by a processor and that may communicate control signals to the beamforming integrated circuit 110 to control operation of the bypass circuit 212 (and optionally other circuits). The controller 218 is depicted in phantom because it may be integrated with the beamforming integrated circuit 110 or it may be implemented on another circuit (or within another system) that is configured to communicate with the beamforming integrated circuit 110.

When the switch 602 is inactive, in a receive mode, the TTD 210 may apply a true time delay to the output data produced by the phase shifting/partial beamforming network 208 before providing the delayed partial beam data to the adder network 214. In a transmit mode. In this example, the TTD 210 may include an integer delay circuit 604 that may be configured to add integer delays to the data. The TTD 210 may also include a fractional delay circuit 606 that may be configured to add fractional delays to the data.

The transmit side is completely symmetric to the receive side, except that the SERDES logic 216 provides the data to the TTDs 210 or directly to the phase shifting/partial beamforming network 208 without accumulating via the adder network 214. The same beam data is passed over the SERDES network to every beamforming integrated circuit 110 in the network, then each separate beam is delayed by the TTD 210 and passed to the transmit beamforming network 208 and out to the antenna elements. Accordingly, the TTD 210 may be reused and may be bidirectional.

As previously mentioned, the SERDES logic 216 may include a waveform alignment buffer 220 to accumulate and align the beam data. Since processing by each beamforming integrated circuit 110 may introduce processing delays, the waveform alignment buffer 220 may be configured to align the sample data to produce a coherent beam output signal. While the waveform alignment buffer 220 is depicted as being part of the SERDES logic 216, in some implementations, the waveform alignment buffer 220 may be implemented externally to the SERDES logic 216. In some implementations, the alignment delay could be part of the true time delay provided by the TTD circuit 210.

In conjunction with the circuits, systems, and methods described above with respect to FIGS. 1-6, a hybrid digital delay beamforming circuit is described for both reception and transmission of signals via a satellite array. The hybrid digital delay beamforming circuit may include multiple integrated circuits that cooperate to form a full beamforming network. Each integrated circuit may support N antennas and K beams. Each circuit may include a phase shifting/partial beamforming network 208 that may be configured to receive a digital signal and to multiply the digital signal for each antenna/beam combination by a phasor multiplier 304 to scale and phase-shift each beam signal from each antenna to produce adjusted beam signals. The phase shifting/partial beamforming network 208 may include an adder 306 to combine the adjusted beam signals to produce partial beam signals, each of which is representative of one of the beams.

Each circuit may also include a true time delay circuit 210, which may include an integer delay portion and a fractional delay portion to compensate for various delays. The amount of the true time delay may be a function of the angle of arrival of the individual beams. Additionally, the true time delay circuit 210 may be configured to compensate for circuit delays, serializer/deserializer (SERDES) delays, and other delays to produce time-adjusted partial beam signals, which may be combined with corresponding time-adjusted partial beam signals from other circuits in the beamforming network.

In some implementations, the true time delay circuit 210 may be bypassed based on signals from a controller 218, which may selectively activate the bypass circuit 210. In some implementations, the controller 218 may selectively activate the bypass circuit 212 based on a determined steering angle relative to the signal source/signal target 112 to communicate data between the phase shifting/partial beamforming network 208 and one of the adder network 214 or the SERDES logic 216.

As previously discussed, the TTD 210 and the phase shifting/partial beamforming network 208 operate bidirectionally to produce beam signals from received antenna signals and to produce antenna signals from received beam signals. Unlike prior art delay circuits which would provide a delay for every antenna/beam combination using multiple multiply operations, the TTD 210 and phase shifting/partial beamforming network 208 significantly reduces power consumption by only applying the true time delay operation to the partially formed beams at the output (or input) of the beamforming network 208. Additionally, the phase shifting/partial beamforming network 208 applies a single phasor multiplication operation for each antenna/beam signal as compared to the multiple multiplication steps in the prior art. Accordingly, the TTD 210 and the phase shifting/partial beamforming network 208 may cooperate to significantly reduce processing flops and power consumption as compared to delay circuits in the prior art.

Although the present invention has been described with reference to preferred embodiments, workers skilled in the art will recognize that changes may be made in form and detail without departing from the scope of the invention.

What is claimed is:

1. A system comprising:

an integrated circuit comprises:

a phase shifting/partial beamforming network (PSPBN) circuit including:

a plurality of first connectors, each first connector coupled to and configured to receive a signal from one of a plurality of antenna elements;

a plurality of second connectors, each second connector corresponding to a beam of a plurality of beams; and circuitry configured to separate the signal into a plurality of antenna/beam signals in response to receiving signals at the plurality of antenna elements, each antenna/beam signal corresponding to a beam of a plurality of beams, the circuitry configured to multiply each antenna/beam signal by a phasor to produce an adjusted antenna/beam signal, combine the adjusted antenna/beam signals from each input to produce a partial beam output signal for each of the plurality of beams, and provide each partial beam output signal to one of the plurality of second connectors; and a plurality of true time delay (TTD) circuits, each TTD circuit including a first connector coupled to one of the plurality of second connectors of the PSPBN and including a second connector, each TTD circuit configured to apply a true time delay to the partial beam output signal at the one of a plurality of outputs of the PSPBN to produce a delayed partial beam output signal and to provide the delayed partial beam output signal to the second connector of the TTD circuit; and an adder network coupled to the second connector of each TTD circuit and configured to accumulate the delayed partial beam output signals for each beam.

2. The system of claim 1, wherein each TTD is configured to apply one or more of an integer delay or a fractional delay to the partial beam output signal to produce the delayed partial beam output signal.

3. The system of claim 1, wherein the integrated circuit further includes a serializer/deserializer (SERDES) logic configured to couple the integrated circuit to one or more adjacent integrated circuits via a SERDES network and coupled to the adder network.

4. The system of claim 3, further comprising:

a plurality of bypass circuits, each bypass circuit including a first connector coupled to one of the plurality of second connectors of the PSPBN, a second connector coupled to the SERDES logic, and a control terminal; and wherein a controller coupled to the control terminals of each of the plurality of bypass circuits, the controller configured to selectively provide a control signal to the control terminals to activate the plurality of bypass circuits when a steering angle of a signal received by the plurality of antenna elements is within a threshold range of angles.

5. The system of claim 3, wherein, in a transmit mode, the circuitry is configured to:

receive beam signals from one of the SERDES logic or the plurality of TTD circuits;

separate each beam signal into a plurality of beam/antenna signals, each beam/antenna signal corresponding to an antenna element of a plurality of antenna elements;

multiply each beam/antenna signal by a phasor to produce an adjusted beam/antenna signal;

combine the adjusted beam/antenna signals for each antenna element to produce an antenna output signal for each of the plurality of antenna elements; and provide the antenna output signals to the plurality of antenna elements.

6. A system comprises:

an integrated circuit comprising:

a phase shifting/partial beamforming network (PSPBN) circuit including a plurality of first connectors and a plurality of second connectors, each first connector coupled to one of a plurality of antenna elements, each second connector corresponding to a beam of a plurality of beams;

an adder network configured to accumulate partial beam signals for each beam;

a serializer/deserializer (SERDES) logic coupled to the adder network;

a plurality of true time delay (TTD) circuits, each TTD circuit coupled to one of the plurality of second connectors, the adder network, and the SERDES logic and configured to apply a true time delay to a signal from one of the second connectors or the SERDES logic; and a plurality of bypass circuits, each bypass circuit including a first terminal coupled to one of the second connectors, a second connector coupled to one of the adder network or the SERDES logic, and a control terminal responsive to a control signal from a controller to selectively couple the PSPBN circuit to the one of the adder network or the SERDES logic to bypass the TTD circuits without applying the true time delays.

7. The system of claim 6, wherein, in a receive mode, the PSPBN circuit is configured to:

receive a signal from each of the plurality of antenna elements;

separate each signal into a plurality of antenna/beam signals, each antenna/beam signal corresponding to a beam of a plurality of beams;

multiply each antenna/beam signal by a phasor to produce an adjusted antenna/beam signal;

combine the adjusted antenna/beam signals for each beam to produce a partial beam output signal for each of the plurality of beams; and provide each partial beam output signal to one of the plurality of second connectors.

8. The system of claim 7, wherein the controller is configured to selectively activate the plurality of bypass circuits when a steering angle of a source of the signals received by the plurality of antenna elements is within a threshold range of angles.

9. The system of claim 7, wherein the adder network is configured to accumulate the partial beam output signals from the PSPBN circuit and from other integrated circuits coupled to the integrated circuit.

10. The system of claim 7, wherein each of the plurality of TTD circuits is configured to apply one or more of an integer delay or a fractional delay to the partial beam output signal and to provide the delayed partial beam output signal to the SERDES logic.

11. The system of claim 6, wherein, in a transmit mode, the PSPBN circuit is configured to:

receive beam signals from one of the SERDES logic or the plurality of TTD circuits;

separate each beam signal into a plurality of beam/antenna signals, each beam/antenna signal corresponding to an antenna element of a plurality of antenna elements;

multiply each beam/antenna signal by a phasor to produce an adjusted beam/antenna signal;

combine the adjusted beam/antenna signals for each antenna element to produce an antenna output signal for each of the plurality of antenna elements; and provide the antenna output signals to the plurality of antenna elements.

12. The system of claim 10, wherein the controller is configured to selectively activate the plurality of bypass circuits when a steering angle of a target for the signals to be transmitted by the plurality of antenna elements is within a threshold range of angles.

13. The system of claim 10, wherein each of the plurality of TTD circuits is configured to apply one or more of an integer delay or a fractional delay to a beam signal from the SERDES logic and to provide the delayed beam signal to the PSPBN circuit.

14. A method of hybrid digital beamforming, the method comprising:

receiving, at a phase shifting/partial beamforming network (PSPBN) circuit, a plurality of beams corresponding to radio frequency (RF) signals from a plurality of antenna elements; and determining a steering angle of a source of the RF signals received by the plurality of antenna elements;

when the steering angle is outside of a threshold range of angles, determining a true time delay using a plurality of true time delay (TTD) circuits and applying the true time delay to one or more of the plurality of beams; and when the steering angle is within a threshold range of angles, selectively coupling the PSPBN circuit to one of an adder network or a serializer/deserializer (SERDES) logic circuit coupled to the adder network to bypass the plurality of TTD circuits without applying the true time delays.

15. The method of claim 14, wherein receiving at the PSPBN circuit comprises:

receiving a signal from each of the plurality of antenna elements;

separating each signal into a plurality of antenna-beam signals, each antenna-beam signal corresponding to a beam of a plurality of beams;

multiplying each antenna/beam signal by a phasor to produce an adjusted antenna-beam signal;

combining the adjusted antenna-beam signals for each beam to produce a partial beam output signal for each of the plurality of beams; and providing each partial beam output signal to one of the plurality of antenna elements.

16. The method of claim 15, further comprising accumulating the partial beam output signals from the PSPBN circuit.

17. The method of claim 16, further comprising:

applying one or more of an integer delay or a fractional delay to each partial beam output signal; and providing the delayed partial beam output signals to the serializer/deserializer (SERDES) logic circuit.

18. The method of claim 14, wherein, in a transmit mode, the method comprises:

receiving beam signals from one of the SERDES logic circuits or the plurality of TTD circuits;

separating each beam signal into a plurality of beam-antenna signals, each beam-antenna signal corresponding to an antenna element of the plurality of antenna elements;

multiplying each beam/antenna signal by a phasor to produce an adjusted beam-antenna signal;

combining the adjusted beam-antenna signals for each antenna element to produce an antenna output signal for each of the plurality of antenna elements; and providing the antenna output signals to the plurality of antenna elements.

19. The method of claim 14, further comprising selectively activating a plurality of bypass circuits when a steering angle of a source of the signals received by the plurality of antenna elements is within a threshold range of angles.

20. The method of claim 18, further comprising selectively bypassing the plurality of TTD circuits when a steering angle of a target for the signals to be transmitted by the plurality of antenna elements is within a threshold range of angles.

* * * * *